Aug. 4, 1942.                M. MEROLO                2,292,281
                         MUD GRIP FOR TIRES
                         Filed Nov. 2, 1940
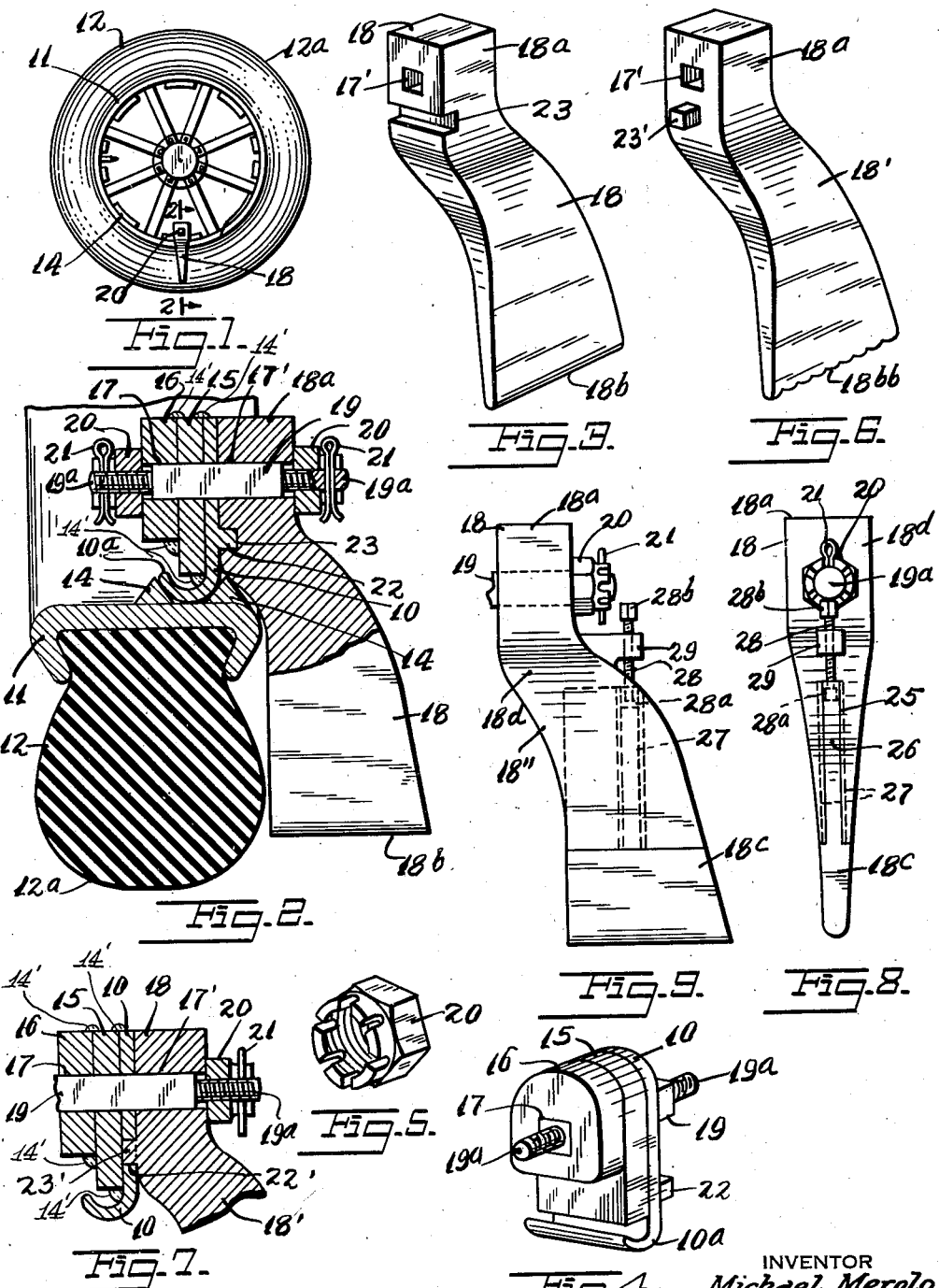
INVENTOR
Michael Merolo
BY
ATTORNEY Patented Aug. 4, 1942

2,292,281

UNITED STATES PATENT OFFICE 2,292,281

MUD GRIP FOR TIRES

Michael Merolo, Richmond, Staten Island, N. Y.

Application November 2, 1940, Serial No. 363,968

5 Claims. (Cl. 301—44)

This invention relates to new and useful improvements in a mud grip for tires.

The invention has for an object the construction of a mud grip adapted to be mounted upon the steel rim of an automobile wheel and adapted to extend radially, partially across the height of a tire so as to be engageable into mud into which a tire may sink while its on an automobile transversing on a muddy road.

Still further the invention proposes to so construct the mud grip that it will be held against any possible turning, or shifting during its use. It should be borne in mind that a heavy load will be placed on the mud grip, since it is required to move the entire truck or vehicle out from the mud during its operation.

More specifically the invention proposes to characterize the mud grip by a steel member adapted to be welded upon the steel rim of an automobile wheel, or the like, and certain blocks welded upon the steel member to thicken and strengthen it. Furthermore it is proposed to form a non-circular opening through the blocks, and the member, and to mount a non-circular stem through these parts, and to mount the mud grip which is to be of blade shape upon said stem in a way so that it is rigidly held in position.

More specifically the invention proposes to form the blade body with a thickened inner end portion also having a non-circular opening which is aligned with said non-circular opening in the block. It is proposed to form the stem with cylindrical ends upon which locking nuts are engaged, which serve to hold the parts together in position on the steel member and block.

Moreover the invention contemplates the use of interengaging elements formed or mounted upon the blade body and upon the member, arranged eccentrically of the opening, for assisting in holding the blade against turning.

Still further the invention proposes the construction of a mud grip as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Fig. 1 is an elevational view of an automobile wheel with a mud grip mounted thereon and constructed in accordance with this invention.

Fig. 2 is a fragmentary enlarged sectional view taken on the line 2—2 of Fig. 1.

Fig. 3 is a perspective view of the blade shaped body, per se.

Fig. 4 is a perspective view of the steel member, blocks, and the non-circular stem illustrated in a joined unit.

Fig. 5 is a perspective view of one of the locking nuts used in the device.

Fig. 6 is a perspective view of the blade shaped body, to be used in a modified form of this invention.

Fig. 7 is a fragmentary vertical sectional view of a mud grip constructed according to a modification of this invention, and shown using the blade body illustrated in Fig. 6.

Fig. 8 is a front elevational view of a mud grip constructed according to a further modification of this invention.

Fig. 9 is a fragmentary side elevational view of Fig. 8.

The mud grip for tires in accordance with this invention includes a steel body 10 adapted to be welded upon the steel rim 11 of an automobile wheel 12, or the like. The drawing illustrates the wheel as having a solid tire 12$^a$ but this is only for purposes of illustration. An air inflated tire, or other tire, may be used in conjunction with this invention.

The steel body 10 has its inner end bent into a flange portion 10$^a$ which is welded to the rim 11. This flange portion is welded upon the rim and the metal added by the welding is indicated by reference numeral 14.

Several blocks 15, and 16 are welded upon the inner face of the steel member 10 to thicken it. Welded areas between these blocks are indicated by the reference numeral 14'. A non-circular opening 17, preferably square in transverse cross section, is formed through the blocks 15 and 16 and through the steel member 10. A blade shaped body 18 is arranged adjacent the member 10 and has a thickened inner end 18$^a$ which has a non-circular opening 17' aligned with the opening 17. This opening 17' is of square shape in transverse cross section and of the same dimension as the opening 17. A non-circular stem 19 is engaged through the openings 17 and 17' for holding the parts fixedly connected together against turning.

The stem 19 has cylindrical end portions 19$^a$ which are threaded. Nuts 20 threadedly engaged upon the cylindrical ends 19$^a$ and serve to hold the stem fixedly in position. These nuts 20 are locked in position by cotter pins 21 engaging through the ends 19$^a$.

Interengaging elements 22 and 23 are formed upon the blade body 18ª and the steel member 10, eccentrically of the openings 17' and 17 for assisting in holding the blade against turning. The element 22 comprises a projection or flange formed or mounted upon the steel body 10, and extending into a groove 23 formed in the body portion 18ª. This groove 23 comprises the element on the body portion. The flange and groove, 22 and 23, extend transversely across the entire width of the body portion 18ª, and so formed a rigid and strong construction for holding these parts against turning.

The blade 18 tapers from its inner end 18ª to its outer extremity 18ᵇ. At this outer extremity it is relatively thin, but at this extremity it broadens out in width. The body of the plate 18 moreover projects downwards and outwards as illustrated in Figs. 2 and 3, so that it may engage over the edge of the rim 11.

In Figs. 6 and 7, a modified form of the invention has been disclosed which distinguishes from the prior form in several respects. In this form of the invention the mud grip includes a blade shaped body 18' having its bottom edge 18ᵇᵇ formed with scallops, or other elements, to assist in gripping the ground during the operation of the mud grip. Moreover the interengaging elements in this form of the invention includes a rectangular shaped lug 23' mounted upon or projecting from the body portion of the blade body and engaged into a complementary shaped opening 22' formed in the steel member 10. In other respects this form of the invention is identical to the prior form and the same parts may be recognized by the same reference numerals.

In Figs. 8 and 9 another modified form of the invention has been disclosed which is distinguished from the prior form especially in the fact that the blade body 18" is formed of two sections. There is an outer section 18ᶜ which slidably connects with the inner section 18ᵈ. The section 18ᵈ is formed with a relatively long groove 25 into which the upper end 26 of the lower section 18ᶜ engages. At the sides these parts are slidably connected together with interengaging dovetailed tongues and grooves 27.

A screw 28 has a cylindrical bottom end 28ª rotatively mounted in the upper portion of the blade section 18ᶜ. This screw 28 threadedly passes through a lug 29 formed upon the top section 18ᵈ. The screw 28 is provided at its upper end with a head 28ᵇ by which it may be turned. The arrangement is such that when the screw 28 is turned, the bottom section 18ᶜ may be lowered or raised as desired.

The operation of the invention is as follows:

The mud grip is mounted upon the steel rim on one or more of the wheels of an automobile, either passenger car or truck. It is particularly intended for trucks since they usually have heavy loads, and often become stuck in snow or mud.

During the normal operation of the vehicle the mud grip does not engage the ground. However if the vehicle travels over muddy roads, or snow covered roads and sinks down, then the blade body is adapted to grip the mud or snow to assist in propelling the vehicle forwards. Without the mud grip when the vehicle becomes stuck in mud or snow and attempts to get out by spinning its wheels it merely sinks deeper down. With the mud grip a position will soon be reached when the grip engages the mud or earth, or some other parts, and forms a sufficient grip to propel the vehicle forwards.

In the form of the invention illustrated in Figs. 9 and 10, when occasion arises the bottom section 18ᶜ of the blade body may be projected further downwards so as to facilitate its gripping the mud or snow. Normally when the roads are clear the section 18ᶜ is carried around in its retracted position. It is only in emergency when the vehicle becomes stuck on a soft road, and if the mud grip does not work in its natural position, then the section 18ᶜ is extended.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A mud grip for tires, comprising a steel member adapted to be welded upon the steel rim of an automobile wheel, or the like, a block welded on said steel member to thicken it, a non-circular opening through said block and member, a blade shaped body adjacent said member and having a thick inner end portion having a non-circular opening aligned with said opening, a non-circular stem engaging through said openings for holding said parts fixedly against turning, said stem having cylindrical ends, nuts mounted on said ends for holding the stem in place, inter-engaging elements on said blade body and member eccentric of said opening for assisting in holding the blade against turning, said blade shape body having an outer section slidably mounted on an inner section, and means for holding said outer section in various extended positions.

2. A mud grip for tires, comprising a steel member adapted to be welded upon the steel rim of an automobile wheel, or the like, a block welded on said steel member to thicken it, a non-circular opening through said block and member, a blade shaped body adjacent said member and having a thick inner end portion having a non-circular opening aligned with said opening, a non-circular stem engaging through said openings for holding said parts fixedly against turning, said stem having cylindrical ends, nuts mounted on said ends for holding the stem in place, inter-engaging elements on said blade body and member eccentric of said opening for assisting in holding the blade against turning, said blade shape body having an outer section slidably mounted on an inner section, and means for holding said outer section in various extended positons, said sections being slidably connected together with interengaging tongues and grooves.

3. A mud grip for tires, comprising a steel member adapted to be welded upon the steel rim of an automobile wheel, or the like, a block welded on said steel member to thicken it, a non-circular opening through said block and member, a blade shaped body adjacent said member and having a thick inner end portion having a non-circular opening aligned with said opening, a non-circular stem engaging through said openings for holding said parts fixedly against turning, said stem having cylindrical ends, nuts mounted on said ends for holding the stem in place, interengaging elements on said blade body and member eccentric of said opening for assisting in holding the blade against turning, said blade shape body having an outer section slidably mounted on an inner section, and means for holding said outer section in various extended positions, and a screw rotatively connected with one of the sections and threadedly engaging the other of the sections and adapted to be turned to extend or retract the sections relative to each other.

4. In a mud grip for an automobile wheel, a steel member adapted to be welded to the rim of said wheel, a blade shaped body positioned radially adjacent said steel member and tire of said wheel, means for attaching the inner end of said body to said steel member with its outer edge disposed adjacent the periphery of said wheel, said body being formed of separate sections, comprising an inner section attached to said steel member and an outer section slidably engaging said inner section, and means for holding said outer section in various extended positions relative to said inner section, comprising a lug mounted on said inner section, a screw having its intermediate portion threadedly passing through said lug, said screw having one of its ends freely passing through said inner section and rotatively connected to said outer section, and means on the other end of said screw for facilitating the rotation thereof to extend said outer section.

5. In a mud grip for an automobile wheel, a steel member adapted to be welded to the rim of said wheel, a blade shaped body positioned radially adjacent said steel member and tire of said wheel, means for attaching the inner end of said body to said steel member with its outer edge disposed adjacent the periphery of said wheel, said body being formed of separate sections, comprising an inner section attached to said steel member and an outer section slidably engaging said inner section, and means for holding said outer section in various extended positions relative to said inner section, comprising a lug mounted on said inner section, a screw having its intermediate portion threadedly passing through said lug, said screw having one of its ends freely pasing through said inner section and rotatively connected to said outer section, and means on the other end of said screw for facilitating the rotation thereof to extend said outer section, said rotative connection of said screw with said outer section, comprising a cylindrical end formed on the said end of said screw and set into said outer section.

MICHAEL MEROLO.